(12) United States Patent
Sato et al.

(10) Patent No.: US 9,017,877 B2
(45) Date of Patent: Apr. 28, 2015

(54) CURRENT COLLECTOR FOR NONAQUEOUS SOLVENT SECONDARY BATTERY, AND ELECTRODE AND BATTERY, WHICH USE THE CURRENT COLLECTOR

(75) Inventors: Hajime Sato, Ebina (JP); Kenji Hosaka, Yokosuka (JP); Hideaki Horie, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1080 days.

(21) Appl. No.: 12/126,318

(22) Filed: May 23, 2008

(65) Prior Publication Data

US 2008/0292963 A1    Nov. 27, 2008

(30) Foreign Application Priority Data

May 24, 2007 (JP) ................................. 2007-137837
Apr. 21, 2008 (JP) ................................. 2008-109709

(51) Int. Cl.
*H01M 4/66* (2006.01)
*H01M 4/70* (2006.01)
*H01M 4/13* (2010.01)

(52) U.S. Cl.
CPC .............. *H01M 4/661* (2013.01); *H01M 4/667* (2013.01)

(58) Field of Classification Search
CPC ............................................... H01M 4/64–4/84
USPC ................. 429/517–520, 522, 149, 151–155, 429/160–162
See application file for complete search history.

(56) References Cited

U.S. PATENT DOCUMENTS

| 5,643,696 A | 7/1997 | Rowlette |
| 6,692,863 B1 | 2/2004 | Nakanishi et al. |
| 2002/0080558 A1* | 6/2002 | Nonaka et al. ................ 361/502 |
| 2002/0122975 A1* | 9/2002 | Spillman et al. .............. 429/128 |
| 2002/0142211 A1 | 10/2002 | Nakanishi et al. |
| 2003/0143466 A1* | 7/2003 | Goda et al. .................... 429/241 |
| 2004/0128826 A1 | 7/2004 | Nakanishi et al. |
| 2004/0131930 A1* | 7/2004 | Nakanishi et al. ............ 429/161 |
| 2004/0247998 A1 | 12/2004 | Nakanishi et al. |
| 2005/0058906 A1 | 3/2005 | Sugiyama et al. |
| 2005/0208379 A1* | 9/2005 | Musha et al. ............ 429/231.95 |

(Continued)

FOREIGN PATENT DOCUMENTS

| CN | 2236687 Y | 10/1996 |
| CN | 1897345 A | 1/2007 |

(Continued)

OTHER PUBLICATIONS

Japanese Office Action, Feb. 18, 2013, 10 pages.

(Continued)

*Primary Examiner* — Jonathan Crepeau
*Assistant Examiner* — Jacob Buchanan
(74) *Attorney, Agent, or Firm* — Foley & Lardner LLP

(57) ABSTRACT

A current collector for a nonaqueous solvent secondary battery, which includes: a first metal layer; and a second metal layer stacked on a surface of the first metal layer, is composed so that a Young's modulus (E1), Vickers hardness (Hv1) and thickness (T1) of the first metal layer and a Young's modulus (E2), Vickers hardness (Hv2) and thickness (T2) of the second metal layer can satisfy the following Expression:

(E1>E2 or Hv1>Hv2); and T1<T2.

9 Claims, 4 Drawing Sheets

(56) References Cited

U.S. PATENT DOCUMENTS

| | | | |
|---|---|---|---|
| 2006/0105243 A1* | 5/2006 | Okamura et al. | 429/234 |
| 2007/0015047 A1 | 1/2007 | Hosaka et al. | |
| 2007/0082265 A1* | 4/2007 | Itou et al. | 429/223 |

FOREIGN PATENT DOCUMENTS

| | | |
|---|---|---|
| JP | 6-70159 U | 9/1994 |
| JP | 7-226206 A | 8/1995 |
| JP | 9-232003 A | 9/1997 |
| JP | 10-208710 A | 8/1998 |
| JP | 11-238528 A | 8/1999 |
| JP | 2000-100471 A | 4/2000 |
| JP | 2001-118563 A | 4/2001 |
| JP | 2001-236946 A | 8/2001 |
| JP | 2002-216846 A | 8/2002 |
| JP | 2002-279974 A | 9/2002 |
| JP | 2002-279999 A | 9/2002 |
| JP | 2002-280000 A | 9/2002 |
| JP | 2003-31261 A | 1/2003 |
| JP | 2005-190996 A | 7/2005 |
| JP | 2007-42413 A | 2/2007 |
| JP | 2007-122977 A | 5/2007 |

OTHER PUBLICATIONS

European Extended Search Report, May 21, 2014, 5 pages.

* cited by examiner

E1>E2, E2'
HV1>HV2, HV2'
T1>T2<T2'

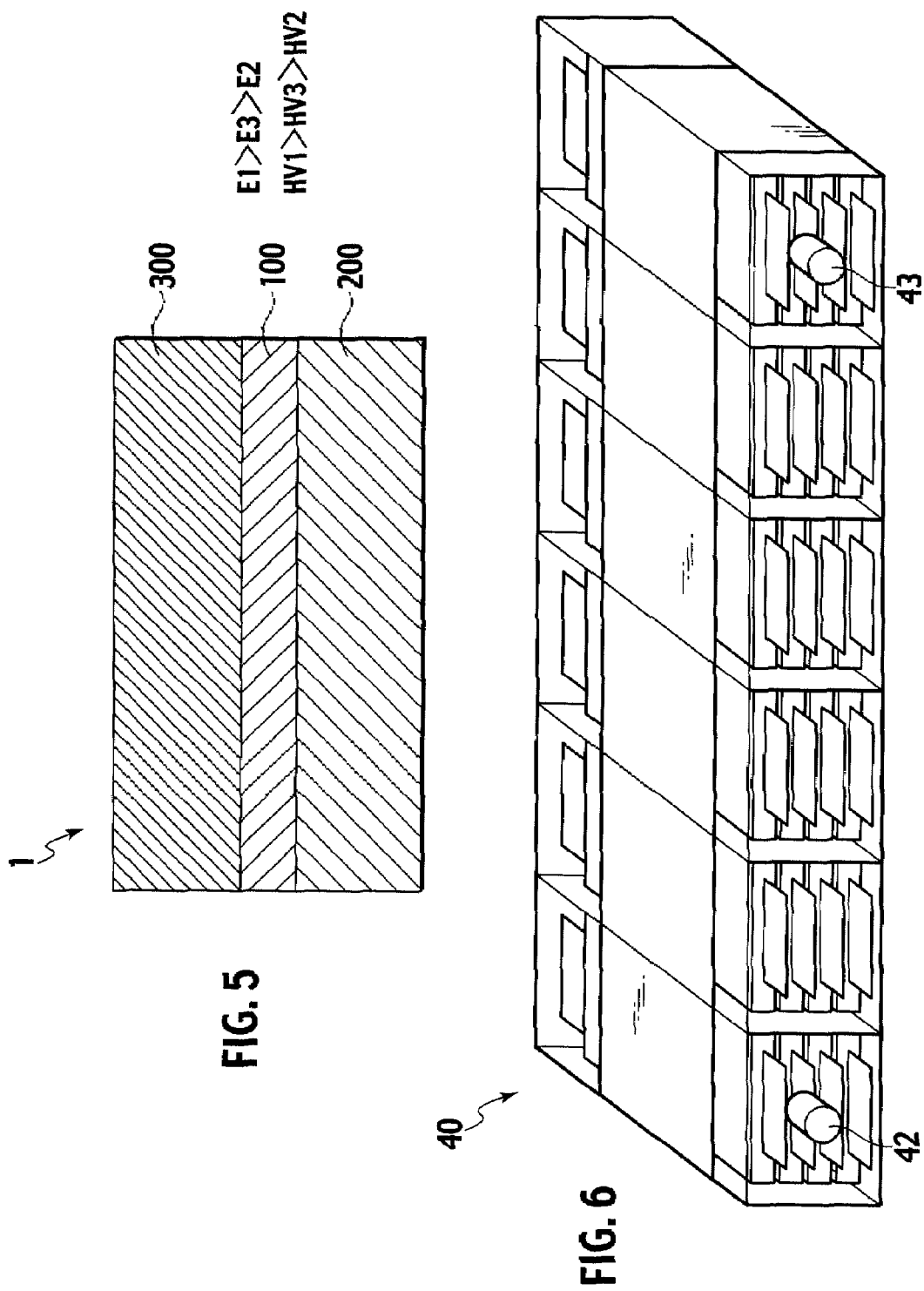

CURRENT COLLECTOR FOR NONAQUEOUS SOLVENT SECONDARY BATTERY, AND ELECTRODE AND BATTERY, WHICH USE THE CURRENT COLLECTOR

BACKGROUND OF THE INVENTION

1. Field of the Invention

The present invention relates to a current collector for a nonaqueous solvent secondary battery, and to an electrode and a battery, which use the current collector.

2. Description of the Related Art

In recent years, in order to deal with the air pollution and the global warming, reduction of an emission amount of carbon dioxide has been eagerly desired. In the automotive industry, expectations have centered on the reduction of the emission amount of the carbon dioxide, which is brought by introducing an electric vehicle (EV) and a hybrid electric vehicle (HEV), and development of a secondary battery for driving a motor, which holds the key to putting these electric vehicle and hybrid electric vehicle into practical use, has been being actively made.

As such a motor driving secondary battery, a nonaqueous solvent secondary battery such as a lithium ion secondary battery having the highest theoretical energy among all the known batteries has attracted attention, and development of the nonaqueous solvent secondary battery has been advanced rapidly at present.

In general, the lithium ion secondary battery includes a stacked body (battery element) formed by connecting a positive electrode, in which a positive electrode active material and the like are coated on both surfaces of a positive electrode current collector by using a binder, and a negative electrode, in which a negative electrode active material and the like are coated on both surfaces of a negative electrode current collector by using the binder, to each other while interposing an electrolyte layer therebetween. Moreover, for the purpose of extracting electric power to the outside, electrode terminals (positive electrode terminal and negative electrode terminal) are electrically connected to the battery element. Furthermore, in general, the battery element is housed in a metal/resin laminate sheet formed by stacking resin sheets on both surfaces of foil made of lightweight metal such as aluminum so that the electrode terminals can be exposed to the outside (refer to Japanese Patent Application No. 2001-236946).

Here, as the current collectors composing the electrodes of the lithium ion secondary battery, in general, foil made of the metal such as the aluminum is used for the positive electrode, and foil made of metal such as copper is used for the negative electrode.

Then, in the case of manufacturing the electrodes by using these foils as the current collectors, slurries in which the electrode active materials, the binder and the like are dispersed into a solvent are coated on surfaces of the foils, followed by drying, and thereafter, press treatment is implemented therefor by using a method such as roll press. In such a way, active material layers which are flat and have a desired thickness are formed on the surfaces of the foils.

SUMMARY OF THE INVENTION

However, when the electrodes are fabricated by using, as the current collectors, the aluminum and copper foils conventionally used in general, there is a problem that wrinkles occur on the foils by the above-described press treatment. When the wrinkles occur on the foils as described, there occurs a problem that the active materials are peeled off from the foils owing to such an occurrence of the wrinkles.

For the purpose of suppressing such an occurrence of the wrinkles, conditions for the press treatment in the case of manufacturing the electrodes are optimized. Specifically, for example, such methods are attempted as thickening the current collectors, reducing a coated amount of the slurries for forming the active material layers, reducing a pressure at the time of the press treatment, and so on.

However, there is a case where the occurrence of the wrinkles is not sufficiently suppressed only by adjusting such conditions for the press treatment. Moreover, when the current collectors are thickened and such a press pressure is reduced, there also occurs a problem that a volumetric energy density of the battery is decreased owing to an increase of a thickness of the current collectors and an increase of a volume of the active material layers. Furthermore, the reduction of the coated amount of the slurries decreases a capacity itself of the entire battery.

In this connection, in order to suppress the occurrences of these various problems to the minimum, a variety of solving means have been proposed besides adjusting the press treatment conditions. For example, a technology has been disclosed, in which, at the time of fabricating the electrodes, meshes are arranged on the current collectors, and the active materials are deposited thereon through the meshes, whereby the active material layers are formed into a mesh shape (refer to Japanese Patent Laid-Open Publication No. 2002-279974). In Japanese Patent Laid-Open Publication No. 2002-279974, with such a configuration, stresses owing to expansion/shrinkage of the active materials on spots on which the active material layers are formed are relieved by providing spots on which the active material layers are hardly formed or are not formed at all, and finally, the occurrence of the wrinkles of the current collectors owing to the stresses is attempted to be prevented.

Note that, for the purpose of providing metal foil for the secondary battery negative electrode, which is excellent in supporting properties and electrical conductivity of the active material, a technology has been proposed, in which parameters of a Vickers hardness and a Young's modulus are controlled in single-layer metal foil formed by an electrolytic deposition method (refer to Japanese Patent Laid-Open Publication No. 2002-27999 and Japanese Patent Laid-open Publication No. 2002-28000).

However, also in the technology described in Japanese Patent Laid-Open Publication No. 2002-279974, such a content of each of the active materials in the active material layers is still partially reduced, and there sill remains the problem that the decrease of the volumetric energy density is inevitable. An influence of such a decrease of the volumetric energy density is significant in a vehicle-mounted lithium ion secondary battery for which further miniaturization is required. Moreover, in the case of composing the current collectors by merely using a highly rigid material in order to suppress the occurrence of the wrinkles on the current collectors, sufficient adhesion properties cannot be obtained between the active material layers and the current collectors, and hence, there is an apprehension that problems may occur that the active material layers are peeled off and that the battery capacity is decreased following the peeling of the active material layers.

As a result of performing an assiduous research, the inventors of the present invention found out that the above-described problems can be solved by employing current collectors with a stack structure in which specific parameters related to an elastic modulus and a rigidity (for example, parameters of the Young's modulus (E) and the Vickers hardness (Hv)) are controlled, whereby the inventors have come to complete the present invention.

Specifically, the present invention is a current collector for a nonaqueous solvent secondary battery, including: a first metal layer; and a second metal layer stacked on a surface of the first metal layer, wherein a Young's modulus (E1) and thickness (T1) of metal composing the first layer and a Young's modulus (E2) and thickness (T2) of metal composing the second layer satisfy the following Expression 1:

$E1 > E2$; and $T1 < T2$

Moreover, the present invention is a current collector for a nonaqueous solvent secondary battery, including: a first metal layer; and a second metal layer stacked on a surface of the first metal layer, wherein a Vickers hardness (Hv1) and thickness (T1) of metal composing the first metal layer and a Vickers hardness (Hv2) and thickness (T2) of metal composing the second metal layer satisfy the following Expression 2:

$Hv1 > Hv2$; and $T1 < T2$

A current collector that satisfies requirements related to both of the Young's modulus and Vickers hardnesses of the present invention is also preferable.

In such first and second current collectors mentioned above for the nonaqueous solvent secondary battery according to the present invention, a metal layer composed of the same metal as the metal composing the second metal layer may be further stacked on a back surface of the first metal layer, which is with respect to the surface on which the second metal layer is stacked. Such a current collector in the present invention, which has such a configuration, is preferably usable for an electrode for a battery (hereinafter, also simply referred to as a "stack battery") in which battery elements are not bipolar (connected in series) but are connected in parallel. In other words, when the current collector having such a configuration is used for the battery, it is preferable that active material layers of which polarities (positive/negative) are the same be formed on both surfaces of the current collector concerned.

Moreover, in the first and second current collectors mentioned above for the nonaqueous solvent secondary battery according to the present invention, a mode is also preferable, in which a third metal layer is further stacked on the back surface of the first metal layer, which is with respect to the surface on which the second metal layer is stacked, and a Young's modulus (E3) and Vickers hardness (Hv3) of metal composing the third metal layer, the Young's modulus (E1, E2) and the Vickers hardness (Hv1, Hv2) satisfy the following expression:

$E1 > E3 > E2$; and/or $Hv1 > Hv3 > Hv2$

Such a current collector in the present invention, which has such a configuration, is preferably usable for an electrode (hereinafter, also simply referred to as a "bipolar electrode") for a battery (hereinafter, also simply referred to as a "bipolar battery") in which battery elements are bipolar (connected in series). In other words, when the current collector having such a configuration is used for the battery, it is preferable that polarities (positive/negative) of the respective active material layers formed on the respective surfaces of the current collector concerned be different from each other.

BRIEF DESCRIPTION OF THE DRAWING

The above and further objects, features and advantages of the invention will more fully appear in the detailed description of embodiments of the invention, when the same is read in conjunction with the drawings, in which:

FIG. 5 is a cross-sectional view of a current collector for a nonaqueous solvent secondary battery according to a third embodiment in a direction perpendicular to a planar direction of the current collector concerned;

FIG. 6 is a perspective view showing an assembled battery of a fourth embodiment.

DETAILED DESCRIPTION OF THE EMBODIMENTS

Figure 1:
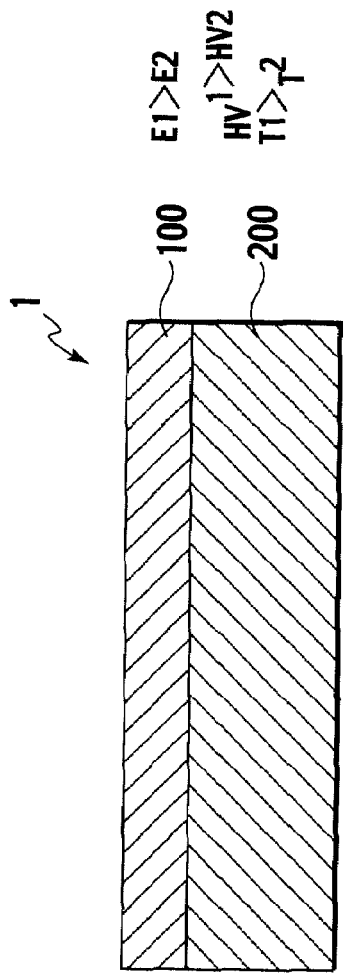
FIG. 1 is a cross-sectional view of a current collector for a nonaqueous solvent secondary battery according to a first embodiment in a direction perpendicular to a planar direction of the current collector concerned.

A description will be made below of embodiments of the present invention while referring to the drawings. Note that, in the description of the drawings, the same reference numerals are assigned to the same elements, and a duplicate description thereof is omitted. Moreover, dimensional ratios of the drawings are exaggerated for convenience of the description, and are sometimes different from those of the actual elements.

First Embodiment

FIG. 1 is a cross-sectional view of a current collector for a nonaqueous solvent secondary battery according to a first embodiment of the present invention in a direction perpendicular to a planar direction of the current collector concerned.

As shown in FIG. 1, a current collector 1 of this embodiment has a foil shape, and has a structure made of two metal layers. Specifically, the current collector 1 has a structure in which a first metal layer 100 and a second metal layer 200 are stacked on each other. In a similar way to a general current collector for a battery, the current collector 1 of this embodiment becomes an electrode in such a manner that active material layers are formed on one or both surfaces thereof, and finally composes an electrode for a battery.

In the current collector 1 of this embodiment, metal (hereinafter, also referred to as "first metal") composing the first metal layer 100 and metal (hereinafter, also referred to as "second metal") composing the second metal layer 200 are selected so that a Young's modulus (E1) and a Vickers hardness (Hv1) of the first metal and a Young's modulus (E2) and a Vickers hardness (Hv2) of the second metal can satisfy a predetermined relationship.

Here, the Young's modulus (E) is a value that defines a value of strain with respect to a stress within an elastic range, and is a value intrinsic to a substance. In other words, the Young's modulus (E) can be calculated as $E = \alpha/\epsilon$ from the following Hooke's law representing a relationship between the stress and the strain within the elastic range:

$$\text{strain}(\epsilon) = \text{stress}(\sigma)/\text{Young's modulus}(E)$$

Hence, it is indicated that, the more the Young's modulus (E) is, the smaller the strain of the substance is with respect to a fixed stress. Note that, as values of the Young's modulus in the present invention, values obtained by a method described in Examples to be described later are employed.

Moreover, the Vickers hardness (Hv) is a value that defines a value of a hardness of the substance, and is a value intrinsic to the substance in a similar way to the above. Broadly speaking, the Vickers hardness (Hv) is calculated in such a manner that a predetermined pyramid-shaped diamond-made indenter is pressed into a surface of a material, and then a relationship between a surface area of a dent caused in this case and a load applied thereto is obtained. It is indicated that, the larger the Hv is, the harder the substance is. Note that, as values of the Vickers hardness in the present invention, values obtained by a method described in Examples to be described later are employed.

In the current collector 1 of this embodiment, the Young's modulus (E1) of the first metal is larger than the Young's modulus (E2) of the second metal (E1>E2). Moreover, the Vickers hardness (Hv1) of the first metal is larger than the Vickers hardness (Hv2) of the second metal (Hv1>Hv2). Specific types of the first metal and the second metal, which are for establishing such configurations, are not particularly limited, and metals conventionally used as materials of the current collector for the battery can be employed as appropriate. As an example of the first metal, nickel, iron, stainless steel, titanium or copper is mentioned. Among them, from a viewpoint of preventing an occurrence of wrinkles, the nickel and the iron are preferable, and the nickel is the most preferable. Moreover, as an example of the second metal, aluminum or the copper is mentioned. Among them, from a viewpoint of sufficiently obtaining an anchor embedding effect of an electrode active material, the aluminum is the most preferable. Just for reference, the values of the Young's modulus (E) and Vickers hardness (Hv) of these metals are shown in Table 1 below based on values in Examples to be described later.

TABLE 1

| | Young's modulus (E) (GPa) | Vickers hardness (Hv) |
|---|---|---|
| Al | 70 | 30 |
| Ti | 100 | 250 |
| Cu | 130 | 70 |
| Stainless steel (SUS316L) | 180 | 200 |
| Fe | 206 | 150 |
| Ni | 206 | 600 |

Furthermore, in the current collector 1 of this embodiment, a thickness (T1) of the first metal layer 100 is smaller than a thickness (T2) of the second metal layer 200 (T1<T2). Specific thicknesses of the respective metal layers (T1, T2) are not particularly limited, and can be set as appropriate in consideration for a type of the battery to which the current collector 1 is applied, easiness of manufacturing the battery concerned, and the like. For example, the thickness (T1) of the first metal layer is preferably about 1 to 100 μm, more preferably about 1 to 50 μm, still more preferably about 1 to 10 μm. Moreover, the thickness (T2) of the second metal layer is preferably about 5 to 200 μm, more preferably about 10 to 100 μm, still more preferably about 10 to 20 μm. The thickness (T1) can be set as appropriate from the ranges as described above so as to satisfy the relationship of: T1<T2. Moreover, when the thickness (T1) of the first metal layer is taken as a reference (1), a ratio of the thickness (T2) of the second metal layer with respect to the thickness (T1) concerned is preferably 1×T1<T2≤10×T1, more preferably 1×T1<T2≤5×T1, still more preferably 1×T1<T2≤2×T1. When the ratio of T2 with respect to T1 taken as the reference (i.e. 1) exceeds 1, adhesion properties between the active material layers and the current collector can be enhanced sufficiently. Meanwhile, when the ratio of T2 with respect to T1 taken as the reference (i.e. 1) is 10 or less, a decrease of a volumetric capacity density of the battery can be suppressed. Note that the thicknesses of the metal layers can be measured by a method (for example, SEM observation of a cross section of each layer) that is conventionally known in public.

In accordance with the current collector for the nonaqueous solvent secondary battery according to the present embodiment, in the nonaqueous solvent secondary battery, the occurrence of the wrinkles on the current collector is suppressed to the minimum while preventing the decrease of the volumetric energy density, and further, the adhesion properties between the active material layers and the current collector can be enhanced.

A size of a plane of the current collector 1 is decided in response to the usage purpose of the battery. If the current collector 1 is used for a large battery, then the current collector 1 should be large. If the current collector 1 is used for a small battery, the current collector should be small.

As described above, the current 1 of this embodiment has the active material layers formed on the surfaces thereof, and finally composes the electrode for the battery. In this case, the active material layers may be formed only on one surface of the current collector 1, or may be formed on both surfaces thereof.

For example, in the case of using the current collector 1 for a battery composed of only one single cell layer (positive electrode/electrolyte layer/negative electrode), the active material layer just needs to be formed on only one surface of the current collector 1. Moreover, also in the case of using the current collector 1 as a current collector of the outermost layer of a bipolar battery, the active material layer just needs to be formed on only one surface of the current collector 1. In these cases, it is recommended that the active material layer be formed on a surface of the second metal layer of the current collector 1. In accordance with such a mode, a back surface with respect to the surface of the current collector 1, on which the active material layer is formed, is backed with a layer (first metal layer) composed of the first metal layer that is relatively thin but has a large Young's modulus. In such a way, strain resistance of the current collector can be enhanced while preventing the decrease of the volumetric energy density of the battery, resulting in that it becomes possible to effectively prevent the occurrence of the wrinkles at the time of forming the active material layer. Moreover, by the fact that the active material layer is formed on a surface of a layer (second metal layer) composed of the second metal layer that has a relatively small Vickers hardness, rigidity of the current collector can be enhanced while preventing the decrease of the volumetric energy density of the battery, and further, owing to the anchor embedding effect of the active material, it becomes possible to enhance the adhesion properties between the current collector and the active material layer. Note that, when the active material layer formed in this case is the positive electrode active material layer, it is preferable to employ, as the second metal, the aluminum having high oxidation resistance. Meanwhile, when the active material layer formed in this case is the negative electrode active material layer, it is possible to employ the copper as the second metal.

Preferably, in the current collector 1 of this embodiment, on the surfaces of the respective layers of the first metal layer 100 and the second metal layer 200, the active material layers different in polarity (positive/negative) are formed, and the current collector 1 is used as an electrode for the bipolar battery (hereinafter, the electrode is also referred to simply as a "bipolar electrode"). In such a mode, preferably, the positive electrode active material layer is formed on the surface of the second metal layer, and the negative electrode active material layer is formed on the surface of the first metal layer. Also in accordance with such a mode, in a similar way to the above, the occurrence of the wrinkles at the time of forming the active material layers is suppressed while preventing the decrease of the volumetric energy density of the battery, thus making it possible to enhance the adhesion properties between the current collector and the active material layers (in particular, the positive electrode active material layer).

Here, preferable combinations of the first metal and the second metal in this embodiment are shown in the following Table 2; however, the technical scope of the present invention is not limited only to the following combinations.

TABLE 2

| First metal | Second metal |
| --- | --- |
| Copper | aluminum |
| Iron | aluminum |
| titanium | aluminum |
| stainless steel | aluminum |
| Iron | copper |
| titanium | copper |
| stainless steel | copper |

A manufacturing method of the first collector 1 of this embodiment is not particularly limited, and conventionally known technologies (device, condition and the like) in public, which are capable of manufacturing a metal stacked body, can be referred to as appropriate. Mentioning an example, the first metal and the second metal are stacked on each other, are supplied to a rolling mill, and are subjected to rolling processing, thus making it possible to manufacture the current collector of this embodiment. Moreover, it is a matter of course that technologies such as a plating method and a sputtering method may be used.

The description has been made above in detail of the first embodiment of the present invention by taking as an example the case where the first metal and the second metal satisfy the predetermined requirements related to the parameters of both of the Young's modulus (E) and the Vickers hardness (Hv). However, the following mode as a modification example of the first embodiment is also incorporated in the technical scope of the present invention. Here, in this mode, the first metal and the second metal satisfy the above-described requirements related to only either the Young's modulus (E) or the Vickers hardness (Hv), and do not satisfy the above-described requirements related to the other.

As described above, preferably, in the current collector 1 of this embodiment, the active material layers different in polarity (positive/negative) are formed on the surfaces of the respective layers, and the current collector 1 is used as the bipolar electrode. Here, just for reference, a cross-sectional view showing an outline of the bipolar battery that employs the current collector 1 of this embodiment is shown in FIG. 2.

Figure 2:
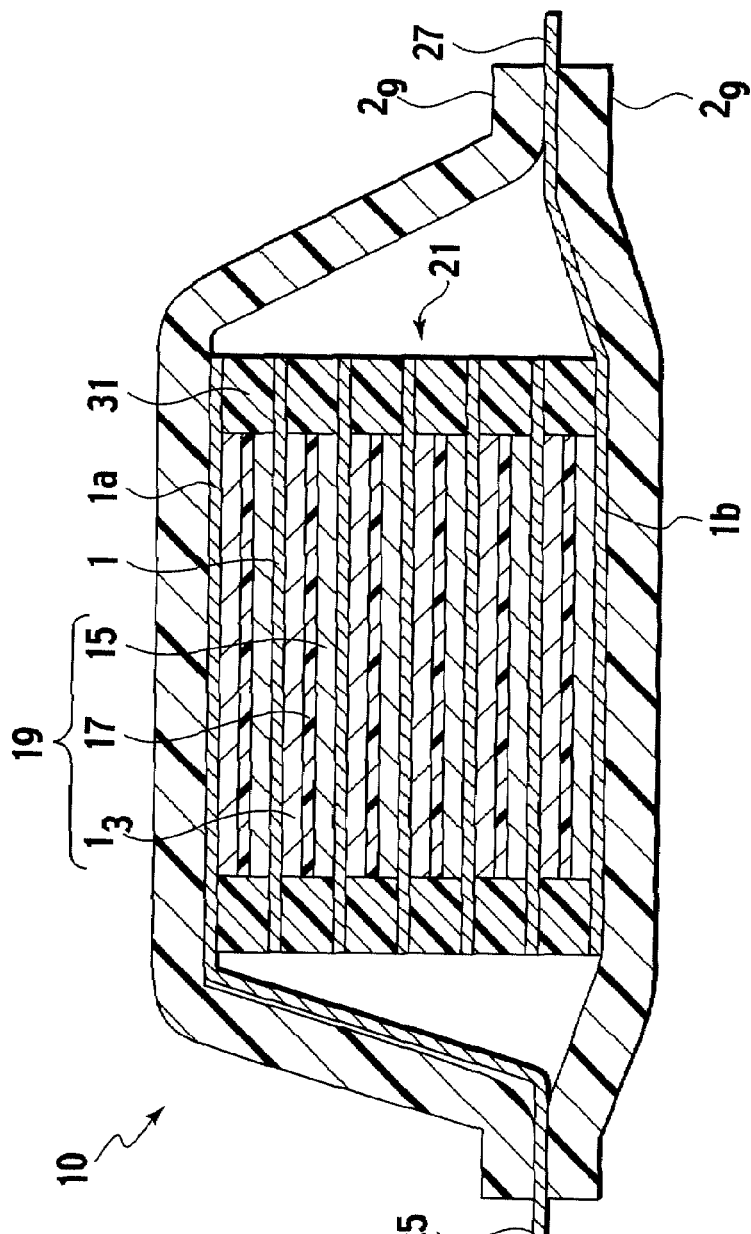
FIG. 2 is a cross-sectional view showing an outline of a bipolar battery that employs the current collector of the first embodiment.

A bipolar battery 10 shown in FIG. 2 has a structure in which a battery element 21 is sealed in an inside of a laminate sheet 29 as a package. Here, the battery element 21 has a shape substantially rectangular in cross section, in which charge/discharge reactions actually progress.

As shown in FIG. 2, the battery element 21 of the bipolar battery 10 of this embodiment includes a plurality of bipolar electrodes, in each of which a positive electrode active material layer 13 is formed on one surface (surface of the second metal layer 200) of the current collector 1, and a negative electrode active material layer 15 is formed on the other surface (surface of the first metal layer 100). The respective bipolar batteries are stacked while interposing electrolyte layers 17 therebetween, thereby forming the battery element 21. In this case, the respective bipolar electrodes and the respective electrolyte layers 17 are stacked so that the positive electrode active material layer 13 of one bipolar electrode and the negative electrode active material layer 15 of the other bipolar electrode adjacent to the one bipolar electrode can face to each other while interposing the electrolyte layer 17 therebetween. Note that each of the electrolyte layers 17 has a configuration formed by holding an electrolyte on a separator.

The positive electrode active material layer 13, the electrolyte layer 17 and the negative electrode active material layer 15, which are adjacent to one another, compose one single cell layer 19. Hence, it can also be said that the bipolar battery 10 has a configuration formed by stacking a plurality of the single cell layers 19. Moreover, on outer circumferences of the plurality of single cell layers 19, insulating layers 31 for insulating current collectors 1 adjacent to one another are provided. Note that, in current collectors (outermost current collectors) (1a, 1b) located on the outermost layers of the battery element 21, only on one surface of each thereof, either one of the positive electrode active material layer 13 (on the surface of the second metal layer 200 of the positive electrode-side outermost current collector 1a) and the negative electrode active material layer 15 (on the surface of the first metal layer 100 of the negative electrode-side outermost current collector 1b) is formed.

Moreover, in the bipolar battery 10 shown in FIG. 2, the positive electrode-side outermost current collector 1a is extended to be defined as a positive electrode tab 25, and the positive electrode tab 25 is exposed from the laminate sheet 29 as the package. Meanwhile, the negative electrode-side outermost current collector 1b is extended to be defined as a negative electrode tab 27, and the negative electrode tab 27 is exposed from the laminate sheet 29 in a similar way.

As described above, in the bipolar battery 10 shown in FIG. 2, the current collectors 1 of the first embodiment are employed as the current collectors thereof. With regard to constituent elements other than the current collectors, modes conventionally known in public as elements of the nonaqueous solvent secondary battery can be employed as appropriate. Although a description will be briefly made below of members composing the bipolar battery 10, which exclude the current collectors, the members are not limited only to the following modes.

[Active Material Layer]

The active material layers contain the active materials, and further contain other additives according to needs.

The positive electrode active material layer 13 contains a positive electrode active material. As the positive electrode active material, for example, there are mentioned: a lithium-transition metal composite compound; a lithium-transition metal phosphate compound; a lithium-transition metal sulfate compound; and the like, such as $LiMn_2O_4$, $LiCoO_2$, $LiNiO_2$, $Li(Ni—Co—Mn)O_2$; and ones in which other elements are partially substituted for transition metals of these. Depending on the case, two types or more of the positive electrode active materials may be used in combination. Preferably, the lithium-transition metal composite oxide is used as the positive electrode active material. Note that it is a matter of course that positive electrode active materials other than the above may be used.

The negative electrode active material layer 15 contains a negative electrode active material. As the negative electrode active material, for example, there are mentioned: a carbon material such as graphite, soft carbon and hard carbon; a lithium-transition metal composite oxide (for example, $Li_4Ti_5O_{12}$); a metal material; a lithium-metal alloy material; and the like. Depending on the case, two types or more of the negative electrode active materials may be used in combination. Preferably, the carbon material or the lithium-transition metal composite oxide is used as the negative electrode active material. Note that it is a matter of course that negative electrode active materials other than the above may be used.

Average particle diameters of the respective active materials contained in the respective active material layers (13, 15) are not particularly limited; however, are preferably 1 to 20 µm, more preferably 1 to 5 µm from a viewpoint of enhancing the output of the battery. However, it is a matter of course that active materials with average particle diameters which go out of the above-described range may be employed. Note that, in this specification, the "particle diameter" means the maximum distance L among distances each of which is the one between arbitrary two points on an outline of an active material particle. As a value of the "average particle diameter", a value calculated as an average value of particle diameters of several to several ten particles observed within a viewing field by using observing means such as a scanning electron microscope (SEM) and a transmission electron microscope (TEM) is employed.

As the additives which can be contained in the positive electrode active material layer 13 and the negative electrode active material layer 15, for example, there are mentioned, a binder, a conductive assistant, electrolyte salt (lithium salt) an ion conductive polymer, and the like.

As the binder, there are mentioned polyvinylidene fluoride (PVdF), a synthetic rubber binder, and the like.

The conductive assistant refers to an additive blended for enhancing conductivity of the positive electrode active material layer 13 or the negative electrode active material layer 15. As the conductive assistant, there are mentioned carbon materials such as carbon black including acetylene black and the like, graphite, and vapor deposition carbon fiber. When the active material layers (13, 15) contain the conductive assistant, electron networks in the insides of the active material layers are formed effectively, whereby the conductive assistant can contribute to enhancement of output characteristics of the battery.

As the electrolyte salt, (lithium salt), there are mentioned $Li(C_2F_5SO_2)_2N)$, $LiPF_6$, $LiBF_4$, $LiClO_4$, $LiAsF_6$, $LiCF_3SO_3$, and the like.

As the ion conductive polymer, for example, there are mentioned a polyethylene oxide (PEO) polymer and a polypropylene oxide (PPO) polymer. Here, the ion conductive polymer may be the same as or different from an ion conductive polymer for use as an electrolyte in each of the electrolyte layers 17 in the bipolar battery 10; however, preferably, is the same.

Compounding ratios of the components contained in the positive electrode active material layer 13 and the negative electrode active material layer 15 are not particularly limited. The compounding ratios can be adjusted by appropriately referring to the findings known in public about the nonaqueous solvent secondary battery.

Thicknesses of the respective active material layers (13, 15) are not particularly limited, either, and the findings conventionally known in public about the nonaqueous solvent secondary battery can be appropriately referred to. Mentioning an example, the thicknesses of the respective active material layers (13, 15) are approximately 2 to 100 µm.

[Electrolyte Layer]

The electrolyte layer 17 is a layer formed by holding the electrolyte on the separator. The electrolyte (specifically, the lithium salt) contained in the electrolyte layer 17 has a function as carriers of lithium ions which move between the positive electrode and the negative electrode at the time of the charge/discharge.

As the electrolyte composing the electrolyte layer 17, in general, a liquid electrolyte or a polymer electrolyte is mentioned. In the present invention, preferably, the polymer electrolyte is used. By using the polymer electrolyte, liquid leakage of the electrolyte and the like is prevented, whereby a lifetime of the bipolar battery 10 can be enhanced.

A material of the polymer electrolyte is not limited as long as the material is composed of the ion conductive polymer and exhibits ion conductivity. For the purpose of allowing the electrolyte to exert excellent mechanical strength, the one may be used, which is formed in such a manner that a polymeric ion conductive polymer is crosslinked by thermal polymerization, ultraviolet polymerization, radiation polymerization, electron beam polymerization, or the like. By using such a crosslinked polymer, reliability of the battery is enhanced, and the bipolar battery 10 that has a simple configuration and excellent output characteristics is obtained. A polymerization initiator that can be blended in this case for progressing a crosslinking reaction by acting on crosslinking groups of the ion conductive polymer is classified into a photopolymerization initiator, a thermal polymerization initiator, and the like in response to external factors for allowing the polymerization initiator concerned to act as an initiator. As the polymerization initiator, for example, there are mentioned: azobisisobutylonitrile (AIBN) as the thermal polymerization initiator; benzyldimethylketal (BDK) as the photopolymerization initiator; and the like.

As the polymer electrolyte, an intrinsic polymer electrolyte and a gel polymer electrolyte are mentioned.

The intrinsic polymer electrolyte is not particularly limited; however, polyethylene oxide (PEO), polypropylene oxide (PPO), a copolymer of these, and the like are mentioned. The electrolyte salt such as the lithium salt can be dissolved well into such polyalkylene oxide polymers. Moreover, these polymers form crosslinking structures, thus making it possible to exert excellent mechanical strength.

Meanwhile, in general, the gel polymer electrolyte refers to the one in which an electrolytic solution is held in an all-solid polymer-electrolyte having the ion conductivity. Note that, in this application, it is defined that the one in which a similar electrolytic solution is held in a polymer skeleton that does not have lithium ion conductivity is also incorporated in the gel polymer electrolyte. A type of the electrolytic solution (electrolyte salt and plasticizer) is not particularly limited. As the electrolyte salt, for example, lithium salts such as LiBETI, $LiBF_4$, $LiPF_6$, $LiN(SO_2CF_3)_2$, and $LiN(SO_2C_2F_5)_2$ are mentioned. Moreover, as the plasticizer, for example, carbonates such as propylene carbonate and ethylene carbonate are mentioned.

[Insulating Layer]

In the bipolar battery 10, in usual, the insulating layers 31 are provided on the peripheries of the respective single cell layers 19. The insulating layers 31 are provided for the purpose of preventing contact between the current collectors 1 adjacent to one another in the battery and an occurrence of a short circuit owing to slight unevenness of end portions of the single cell layers 19 in the battery element 21, and to the like. By placing the insulating layers 31 as described above, long-term reliability and safety of the battery are ensured, and the bipolar battery 10 that is high quality can be provided.

A material composing the insulating layers 31 just needs to be the one having insulating properties, sealing properties against falling off of the solid electrolyte, sealing properties (hermetical sealing properties) against moisture permeation from the outside, heat resistance at a battery operation temperature, and the like. For example, as the material of the insulating layers 31, urethane resin, epoxy resin, polyethylene resin, polypropylene resin, polyimide resin, rubber and the like are usable. Among them, the polyethylene resin and the polypropylene resin are preferably used as the material composing the insulating layers 31 from a viewpoint of corrosion resistance, chemical resistance, fabrication easiness (film-forming properties), cost efficiency, and the like.

[Tab]

In the bipolar battery 10, the tabs (positive electrode tab 25 and negative electrode tab 27) electrically connected to the outermost current collectors (1a, 1b) for the purpose of extracting the current to the outside of the battery are exposed to the outside of the laminate sheet 29 as the package. Specifically, the positive electrode tab 25 electrically connected to the outermost current collector 1a for the positive electrode and the negative electrode tab 27 electrically connected to the outermost current collector 1b for the negative electrode are exposed to the outside of the package.

A material composing the tables (positive electrode tab 25 and negative electrode tab 27) is not particularly limited, and a publicly known material conventionally used for the tabs of the nonaqueous solvent secondary battery is usable. As the material composing the tables, for example, aluminum, copper, titanium, nickel, stainless steel (SUS) and alloys of these are illustrated. Note that, for the positive electrode tab 25 and the negative electrode tab 27, the same material may be used, or different materials may be used. Moreover, as in this embodiment, the outermost current collectors (1a, 1b) are extended, whereby the tabs (25, 27) may be formed, or alternatively, tabs prepared separately from the outermost current collectors may be connected.

[Package]

In order to prevent an impact from the outside at the time of using the battery and to prevent an environmental deterioration, it is preferable that the battery element 21 of the bipolar battery 10 be housed in the package such as the laminate sheet 29. The package is not particularly limited, and a package conventionally known in public is usable. Preferably, a polymer-metal composite laminate sheet and the like, which are excellent in thermal conductivity, are usable since such highly thermal conductive sheets efficiently transfer heat from a heat source of an automobile and can rapidly heat up the inside of the battery to the battery operation temperature.

Note that a method of manufacturing the bipolar battery 10 shown in FIG. 2 is not particularly limited, either, and the findings conventionally known in public, which are related to the manufacture of the bipolar battery, can be referred to as appropriate.

Second Embodiment

Figure 3:
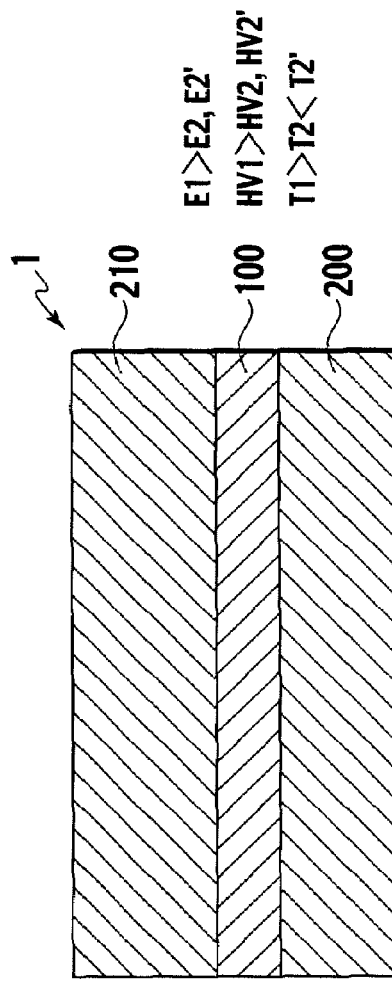
FIG. 3 is a cross-sectional view of a current collector for a nonaqueous solvent secondary battery according to a second embodiment in a direction perpendicular to a planar direction of the current collector concerned.

FIG. 3 is a cross-sectional view of a current collector for a nonaqueous solvent secondary battery according to a second embodiment of the present invention in a direction perpendicular to a planar direction of the current collector concerned.

As shown in FIG. 3, in a current collector 1 of this embodiment, in addition to the first metal layer 100 and the second metal layer 200, another metal layer 210 (hereinafter, also referred to as a "2'nd metal layer") is further stacked on a back surface with respect to a surface of the first metal layer 100, on which the second metal layer 200 is stacked, and in this point the second embodiment is different from the first embodiment mentioned above. Moreover, the 2'nd metal layer 210 is composed of the same metal as the metal composing the second metal layer 200. Specifically, the current collector of this embodiment has a structure in which the relatively thin first metal layer 100 is sandwiched by the relatively thick second metal layer 200 and 2'nd metal layer 210, which are composed of the metal (second metal) having relatively small Young's modulus (E) and Vickers hardness (Hv).

In the current collector 1 of this embodiment, specific modes such as types of the metals (first metal, second metal) composing the first metal layer 100 and the second metal layer 200 and modes such as thicknesses of these layers (100, 200) are similar to those of the above-mentioned first embodiment. Moreover, in the current collector 1 of this embodiment, a specific mode of the 2'nd metal layer 210 is also similar to that of the second metal layer 200 of the above-mentioned first embodiment except that the 2'nd metal layer 210 is stacked on the back surface with respect to the surface on which the second metal layer 200 is stacked. Moreover, the current collector of this embodiment can be manufactured by a similar method to that of the current collector of the above-mentioned first embodiment. Hence, a detailed description regarding specific modes of these is omitted here. Note that, in the current collector 1 of this embodiment, the thickness (T2) of the second metal layer 200 and a thickness (T2') of the 2'nd metal layer may be the same or different; however, preferably, are the same.

Also in accordance with the current collector 1 of this embodiment, in a similar way to the above-mentioned first embodiment, the occurrence of the wrinkles at the time of forming the active material layers is suppressed while preventing the decrease of the volumetric energy density of the battery, thus making it possible to enhance the adhesion properties between the current collector and the active material layers (in particular, the positive electrode active material layer). Moreover, such a three-layer structure is adopted, thus making it possible to compose the second metal layer and the 2'nd metal layer, which are located on both sides of the current collector, from the material having good affinity for the active material layers while enhancing strain resistance and rigidity of the current collector by the first metal layer located in the middle thereof.

Here, preferable combinations of the first metal and the second metal in this embodiment are shown in the following Table 3; however, the technical scope of the present invention is not limited only to the following combinations.

TABLE 3

| First metal | Second metal |
| --- | --- |
| nickel | aluminum |
| iron | aluminum |
| titanium | aluminum |
| stainless steel | aluminum |
| nickel | copper |
| iron | copper |
| titanium | copper |
| stainless steel | copper |

The description has been made above in detail of the second embodiment of the present invention by taking as an example the case where the first metal and the second metal satisfy the predetermined requirements related to the parameters of both of the Young's modulus (E) and the Vickers hardness (Hv) in a similar way to the above-mentioned first embodiment. However, in a similar way to the first embodiment, the following mode as a modification example of the second embodiment is also incorporated in the technical scope of the present invention. Here, in this mode, the first metal and the second metal satisfy the above-described requirements related to only either the Young's modulus (E) or the Vickers hardness (Hv), and do not satisfy the above-described requirements related to the other.

As shown in FIG. 3, in the current collector 1 of this embodiment, the layers (200, 210) made of the same metal are located on both sides thereof. Hence, it is preferable that the current collector 1 of this embodiment be used for an electrode of a stack battery. Here, just for reference, a cross-sectional view showing an outline of the stack battery that employs the current collector 1 of this embodiment is shown in FIG. 4.

Figure 4:
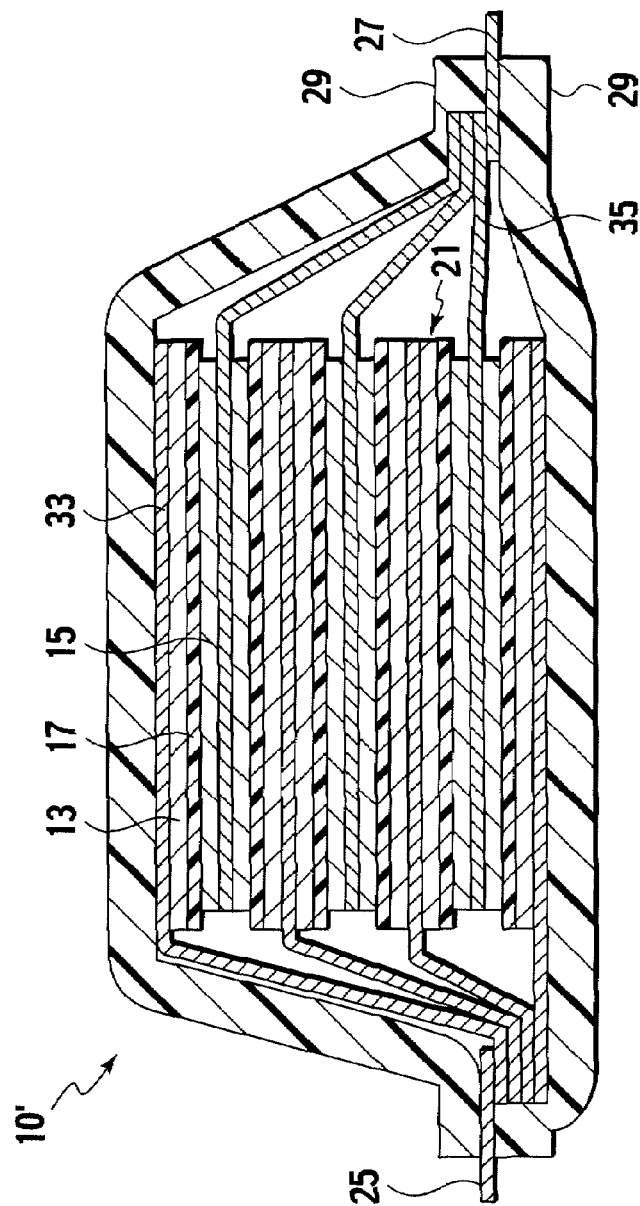
FIG. 4 is a cross-sectional view showing an outline of a bipolar battery that employs the current collector of the second embodiment.

A stack battery 10' shown in FIG. 4 has a structure composed by alternately stacking positive electrodes and negative electrodes while interposing the electrolyte layers 17 therebetween. Here, each of the positive electrodes is composed in such a manner that the positive electrode active material layers 13 are formed on both surfaces of a positive electrode current collector 33 made of the current collector of this embodiment, and in a similar way, each of the negative electrodes is composed in such a manner that the negative electrode active material layers 15 are formed on both surfaces of a negative electrode current collector 35 made of the current collector of this embodiment. Note that, in current collectors located on the outermost layers of the battery elements 21, only on one-side surfaces thereof, the active material layers are formed.

Here, when the current collectors 1 of this embodiment are used as the current collectors (positive electrode current collectors 33) composing the positive electrodes of the stack battery 10', it is preferable that the metal (second metal) composing the second metal layers 200 and the 2'nd metal layers 210, on which the positive electrode active material layers are formed, be the aluminum. Meanwhile, when the current collectors 1 of this embodiment are used as the current collectors (negative electrode current collectors 35) composing the negative electrodes of the stack battery 10', it is preferable that the second metal be the copper. Other specific modes of the stack battery 10' shown in FIG. 4 are not particularly limited, and are composable by referring to the specific modes in the bipolar battery 10 described in the column of the above-mentioned first embodiment and to the other findings conventionally known in public.

Third Embodiment

FIG. 5 is a cross-sectional view of a current collector for a nonaqueous solvent secondary battery according to a third embodiment of the present invention in a direction perpendicular to a planar direction of the current collector concerned.

As shown in FIG. 5, in a current collector 1 of this embodiment, in addition to the first metal layer 100 and the second metal layer 200, another metal layer 300 (hereinafter, also referred to as a "third metal layer") is further stacked on the back surface with respect to the surface of the first metal layer 100, on which the second metal layer 200 is stacked, and in this point, the third embodiment is different from the above-mentioned first embodiment. Moreover, in the current collector 1 of this embodiment, the first metal, the second metal and metal (hereinafter, also referred to as "third metal") composing the third metal layer 300 are selected so that E1 and Hv1, E2 and Hv2, and a Young's modulus (E3) and Vickers hardness (E3) of the third metal can satisfy predetermined relationships.

Specifically, the Young's modulus (E3) of the third metal is smaller than the Young's modulus (E1) of the first metal, and is larger than the Young's modulus (E2) of the second metal (E1>E3>E2). Moreover, the Vickers hardness (Hv3) of the third metal is smaller than the Vickers hardness (Hv1) of the first metal, and is larger than the Vickers hardness (Hv2) of the second metal (Hv1>Hv3>Hv2).

In the current collector 1 of this embodiment, specific modes such as types of the metals (first metal, second metal) composing the first metal layer 100 and the second metal layer 200 and modes such as thicknesses of these layers (100, 200) are similar to those of the above-mentioned first embodiment. Moreover, a specific mode such as a type of the metal (third metal) composing the third metal layer 300 can also be appropriately selected by referring to the modes of the above-described first and second metal layers. Furthermore, the current collector of this embodiment can be manufactured by a similar method to that of the current collector of the above-mentioned first embodiment. Hence, a detailed description regarding specific modes of these is omitted here. Note that, in the current collector 1 of this embodiment, the thicknesses (T1, T2, T3) of the respective metal layers are not particularly defined; however, it is preferable that the thickness T1 be smaller than the thicknesses T2 and T3 (T1<T2, T3). However, the thicknesses are not limited only to such a mode.

Here, preferable combinations of the first to third metals in this embodiment are shown in the following Table 4; however, the technical scope of the present invention is not limited only to the following combinations.

TABLE 4

| First metal | Second metal | Third metal |
|---|---|---|
| nickel | aluminum | copper |
| iron | aluminum | copper |
| iron | aluminum | nickel |
| stainless steel | aluminum | copper |
| titanium | aluminum | copper |
| titanium | aluminum | nickel |

Among the combinations shown in Table 4, in a more preferable mode, the following Expression 7 is satisfied: E2≤100≤E3 (however, E2<E3); and E1≥150. Moreover, in another preferable mode, the following Expression 8 is satisfied: Hv2≤100≤Hv3 (however, Hv2<Hv3); and Hv1≥150. Here, as an example of a combination of the first metal/the second metal/the third metal, which satisfies these definitions, nickel/aluminum/copper and stainless steel/aluminum/copper are mentioned. When the current collector 1 of this embodiment is composed by using these combinations of the metals, functions and effects of the present invention can be exerted far more significantly.

The description has been made above in detail of the third embodiment of the present invention by taking as an example the case where the first metal, the second metal and the third metal satisfy the predetermined requirements related to the parameters of both of the Young's modulus (E) and the Vickers hardness (Hv). However, the following mode as a modification example of the third embodiment is also incorporated in the technical scope of the present invention. Here, in this mode, the first metal, the second metal and the third metal satisfy the above-described requirements related to only either the Young's modulus (E) or the Vickers hardness (Hv), and do not satisfy the above-described requirements related to the other.

It is preferable that the current collector 1 of this embodiment be used for the electrode for the bipolar battery. In such a mode, it is preferable that the positive electrode active material layer be formed on the surface of the second metal layer, and that the negative electrode active material layer be formed on the surface of the third metal layer. Note that a configuration of the bipolar battery is as described in the column of the above-mentioned first embodiment, and accordingly, a detailed description thereof is omitted here.

Also in accordance with the mode as described above, in a similar way to the above-mentioned embodiments, the occurrence of the wrinkles at the time of forming the active material layers is suppressed while preventing the decrease of the volumetric energy density of the battery, thus making it possible to enhance the adhesion properties between the current collector and the active material layers (in particular, the positive electrode active material layer). Moreover, in a similar way to the above-mentioned second embodiment, such a three-layer structure is adopted, thus making it possible to compose the second metal layer and the third metal layer, which are located on both sides of the current collector, from the material having good affinity for the active material layers while enhancing the strain resistance and rigidity of the current collector by the first metal layer located in the middle thereof.

Fourth Embodiment

Assembled Battery

In a fourth embodiment, a plurality of the above-mentioned bipolar batteries (FIG. 2) and/or stack batteries (FIG. 4) are connected in parallel and/or series, whereby an assembled battery is composed.

FIG. 6 is a perspective view showing the assembled battery of this embodiment.

An assembled battery 40 shown in FIG. 6 is composed in such a manner that a plurality of the above-mentioned bipolar batteries 10 are connected to one another. The positive electrode tabs 25 and negative electrode tabs 27 of the respective bipolar batteries 10 are connected to one another by using busbars (not shown), whereby the respective bipolar batteries 10 are connected to one another. On one side surface of the assembled battery 40, electrode terminals (42, 43) are provided as electrodes of the entire assembled battery 40.

A method of connecting the plurality of bipolar batteries 10 composing the assembled battery 40 to one another is not particularly limited, and methods conventionally known in public can be adopted as appropriate. For example, methods using welding such as ultrasonic welding and spot welding and methods of fixing the bipolar batteries by using riveting, crimping and the like can be adopted. In accordance with the connection methods as described above, long-term reliability of the assembled battery 40 can be enhanced.

In accordance with the assembled battery 40 of this embodiment, each of the bipolar batteries 10 composing the assembled battery 40 is excellent in capacity characteristics, and accordingly, an assembled battery excellent in capacity characteristics can be provided.

Note that, with regard to the connection of the bipolar batteries 10 composing the assembled battery 40, all of the plurality of bipolar batteries 10 may be connected in parallel, or all of the plurality of bipolar batteries 10 may be connected in series, or alternatively, serial connection and parallel connection may be combined. In such a way, it becomes possible to freely adjust a capacity and voltage of the assembled battery 40.

Fifth Embodiment

Vehicle

In a fifth embodiment, a vehicle is composed by mounting thereon the above-mentioned bipolar battery 10 or the assembled battery 40 of the fourth embodiment as a power supply for driving a motor. As the vehicle that uses the bipolar battery 10 or the assembled battery 40 as the power supply for the motor, for example, there are mentioned: automobiles each of which drives wheels by the motor, such as a perfect electric vehicle that does not use gasoline, a hybrid vehicle such as a series hybrid vehicle and a parallel hybrid vehicle, and a fuel cell electric vehicle; and other vehicles (for example, train). In such a way, it becomes possible to manufacture a vehicle that has a long lifetime and high reliability as compared with the conventional.

Figure 7:
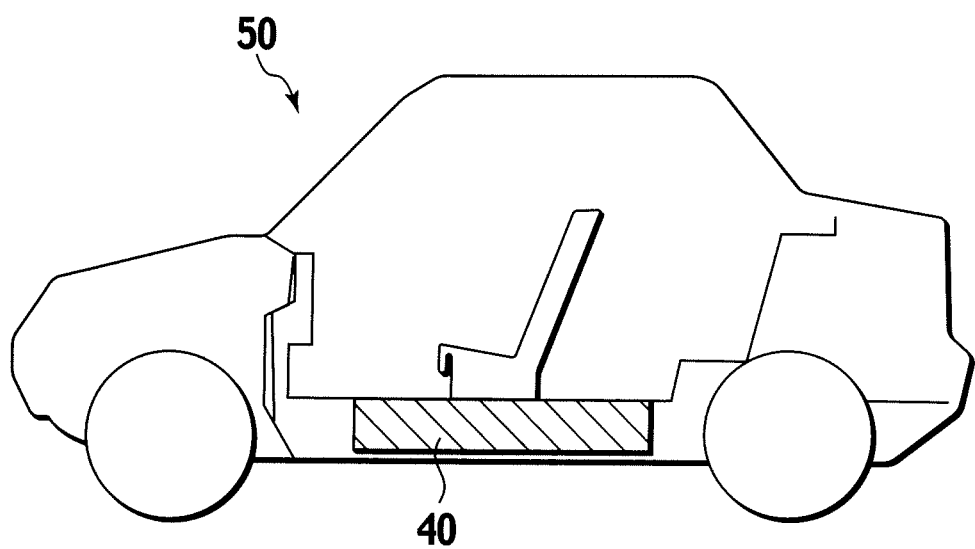
FIG. 7 is a schematic view of an automobile of a fifth embodiment, which mounts thereon the assembled battery of the fourth embodiment.

Just for reference, a schematic view of an automobile 50 that mounts the assembled battery 40 thereon is shown in FIG. 7. The assembled battery 40 mounted on the automobile 50 has the characteristics as described above. Accordingly, the automobile 50 that mounts the assembled battery 40 thereon can have excellent capacity characteristics and the long lifetime.

As above, the description has been made of some of the preferred embodiments of the present invention; however, the present invention is not limited to the embodiments described above, and a variety of alterations, omissions and additions are possible by those skilled in the art.

EXAMPLES

A description will be made of the functions and effects of the present invention by using the following examples and comparative examples. However, the technical scope of the present invention is not limited only to the following examples. Note that physical properties of metal particles for use in the following examples and comparative examples are shown in Table 1. Here, the Young's modulus were measured in conformity with JIS Z 2280. Moreover, the Vickers hardnesses were measured in conformity with JIS Z 2244.

TABLE 5

|  | Young's modulus (E) (GPa) | Vickers hardness (Hv) |
|---|---|---|
| Al | 70 | 30 |
| Ti | 100 | 250 |
| Cu | 130 | 70 |
| SUS316L | 180 | 200 |
| Fe | 206 | 150 |
| Ni | 206 | 600 |

Example 1

Single Layer Battery (Fabrication of Positive Electrode)

As the positive electrode current collector, a cladding material was prepared, which was formed by sequentially stacking Al (15 μm)/Ni (6 μm)/Al (15 μm).

$LiMn_2O_4$ (85 mass parts) as the positive electrode active material, acetylene black (5 mass parts) as the conductive assistant, and polyvinylidene fluoride (PVdF) (10 mass parts) as the binder, were dispersed into an appropriate amount of N-methyl-2-pyrrolidone (NMP) as a slurry viscosity adjusting solvent, whereby positive electrode active material slurry was prepared.

The prepared positive electrode active material slurry was coated on one surface of the positive electrode current collector prepared as above at a surface density (converted to a solid content) of 60 mg/cm² by using a coating device, followed by drying. Subsequently, press treatment was implemented for a thus obtained stacked body at a linear pressure of 10 to 30 t/m by using a roll press machine, whereby a positive electrode active material layer (thickness: 240 μm) was formed on the positive electrode current collector. Then, the stacked body was cut into a size of 6 cm×10 cm, an end portion of a thus obtained stacked body was protected by a polyimide tape, and an Al-made lead was welded to the current collector, whereby a positive electrode was fabricated.

(Fabrication of Negative Electrode)

As the negative electrode current collector, a cladding material was prepared, which was formed by sequentially stacking Cu (6 μm)/Ni (6 μm)/Cu (6 μm).

Amorphous carbon (85 mass parts) as the negative electrode active material, the acetylene black (5 mass parts) as the conductive assistant, and the polyvinylidene fluoride (PVdF) (10 mass parts) as the binder, were dispersed into an appropriate amount of the N-methyl-2-pyrrolidone (NMP) as the slurry viscosity adjusting solvent, whereby negative electrode active material slurry was prepared.

The prepared negative electrode active material slurry was coated on one surface of the negative electrode current collector prepared as above at a surface density (converted to a solid content) of 30 mg/cm² by using the coating device, followed by drying. Subsequently, the press treatment was implemented for a thus obtained stacked body at a linear pressure of 10 to 30 t/m by using the roll press machine, whereby a negative electrode active material layer (thickness: 300 μm) was formed on the negative electrode current collector. Then, the stacked body was cut into a size of 6.4 cm×10.4 cm, and a Ni-made lead was welded to the current collector, whereby a negative electrode was fabricated.

(Fabrication of Single Layer Battery)

As the separator, a polypropylene-made microporous membrane (thickness: 25 μm; size: 7 cm×11 cm) was prepared. Moreover, as the electrolytic solution, a solution was prepared, in which $LiPF_6$ as the lithium salt was dissolved at a concentration of 1M into a mixed solution of ethylene carbonate (EC) and propylene carbonate (PC), which were mixed equally in volume.

The separator prepared as above was sandwiched by the positive electrode and the negative electrode, which were fabricated as above, so that the positive electrode active material layer and the negative electrode active material layer could face to each other. Then, a thus obtained stacked body was housed in a package made of an aluminum laminate sheet so that the Al lead and the Ni lead could be guided to an outside thereof. Subsequently, the electrolytic solution prepared as above was injected into the package, and the package was sealed. In such a way, a single layer battery was completed.

Example 2

Single Layer Battery

A single layer battery was completed by a similar method to that of the above-described Example 1 except using, as the positive electrode current collector, a cladding material formed by sequentially stacking Al (15 μm)/Fe (10 μm)/Al (15 μm).

Example 3

Single Layer Battery

A single layer battery was completed by a similar method to that of the above-described Example 1 except using, as the positive electrode current collector, a cladding material formed by sequentially stacking Al (15 μm)/SUS316L (8 μm)/Al (15 μm).

Example 4

Single Layer Battery

A single layer battery was completed by a similar method to that of the above-described Example 1 except using, as the positive electrode current collector, a cladding material formed by sequentially stacking Al (15 μm)/Ti (10 μm)/Al (15 μm).

Example 5

Single Layer Battery

A single layer battery was completed by a similar method to that of the above-described Example 1 except using, as the negative electrode current collector, a cladding material formed by sequentially stacking Cu (15 μm)/Ni (6 μm)/Cu (15 μm).

Example 6

Single Layer Battery

A single layer battery was completed by a similar method to that of the above-described Example 1 except using, as the negative electrode current collector, a cladding material formed by sequentially stacking Cu (15 μm)/Fe (10 μm)/Cu (15 μm).

Example 7

Single Layer Battery

A single layer battery was completed by a similar method to that of the above-described Example 1 except using, as the negative electrode current collector, a cladding material formed by sequentially stacking Cu (15 μm)/SUS316L (8 μm)/Cu (15 μm).

Example 8

Single Layer Battery

A single layer battery was completed by a similar method to that of the above-described Example 1 except using, as the negative electrode current collector, a cladding material formed by sequentially stacking Cu (15 μm)/Ti (10 μm)/Cu (15 μm).

Example 9

Bipolar Battery (Fabrication of Bipolar Electrode)

As the current collector, a cladding material formed by stacking Al (15 μm)/(Fe (10 μm) was prepared.

Positive electrode active material slurry similar to that of the above-described Example 1 was coated on the Al surface of the current collector prepared as above at a surface density (converted to a solid content) of 60 mg/cm$^2$ by using the coating device, followed by drying. Moreover, negative electrode active material slurry similar to that of the above-described Example 1 was coated on the Fe surface of the current collector prepared as above at a surface density (converted to a solid content) of 30 mg/cm$^2$ by using the coating device, followed by drying. Subsequently, the press treatment was implemented for a thus obtained stacked body at a linear pressure of 10 to 30 t/m by using the roll press machine, whereby a positive electrode active material layer (thickness: 240 μm) and a negative electrode active material layer (thickness: 300 μm) were formed. Then, a thus obtained stacked body was cut into a size of 6 cm×10 cm, whereby a bipolar battery was fabricated.

(Fabrication of Bipolar Battery)

As the separator and the electrolytic solution, materials similar to those of the above-described Example 1 were prepared.

Five pieces of the bipolar electrodes 5 fabricated as above and four pieces of the separators were alternately stacked so that the positive electrode active material layer and negative electrode active material layer of the bipolar electrodes adjacent to each other could face to each other. In this case, on outer circumferential portions of the separators, sealing materials for preventing contact between the positive electrode active material layers and the negative electrode active material layers were arranged. Note that the formation of the active material layers of the bipolar electrodes located on the outermost layers was omitted, and further, an Al-made lead was welded to the current collector (Al surface) of the bipolar electrode located on the outermost layer on the positive electrode side, and Ni-made lead was welded to the current collector (Fe surface) of the bipolar electrode located on the outermost layer on the negative electrode side.

Subsequently, a thus obtained stacked body was housed in a package made of an aluminum laminate sheet so that the Al lead and the Ni lead could be guided to an outside thereof. Then, the electrolytic solution prepared as above was injected into the package, and the package was sealed. In such a way, a bipolar battery was completed.

Example 10

Bipolar Battery

A bipolar battery was completed by a similar method to that of the above-described Example 9 except using, as the current collectors, cladding materials each of which was formed by stacking Al (15 μm; on the positive electrode side)/SUS316L (8 μm; on the negative electrode side).

Example 11

Bipolar Battery

A bipolar battery was completed by a similar method to that of the above-described Example 9 except using, as the current collectors, cladding materials each of which was formed by stacking Al (15 μm; on the positive electrode side)/Ti (10 μm; on the negative electrode side).

Example 12

Bipolar Battery

A bipolar battery was completed by a similar method to that of the above-described Example 9 except using, as the current collectors, cladding materials each of which was formed by stacking Al (15 μm; on the positive electrode side)/Cu (10 μm; on the negative electrode side).

Example 13

Bipolar Battery

A bipolar battery was completed by a similar method to that of the above-described Example 9 except using, as the current collectors, cladding materials each of which was formed by stacking Cu (15 μm; on the positive electrode side)/Fe (10 μm; on the negative electrode side).

Example 14

Bipolar Battery

A bipolar battery was completed by a similar method to that of the above-described Example 9 except using, as the current collectors, cladding materials each of which was formed by stacking Cu (15 μm; on the positive electrode side)/SUS316L (8 μm; on the negative electrode side).

Example 15

Bipolar Battery

A bipolar battery was completed by a similar method to that of the above-described Example 9 except using, as the current collectors, cladding materials each of which was formed by stacking Cu (15 μm; on the positive electrode side)/Ti (10 μm; on the negative electrode side).

Example 16

Bipolar Battery

A bipolar battery was completed by a similar method to that of the above-described Example 9 except using, as the current collectors, cladding materials each of which was formed by sequentially stacking Al (15 μm; on the positive electrode side)/Ni (6 μm)/Cu (15 μm; on the negative electrode side).

Example 17

Bipolar Battery

A bipolar battery was completed by a similar method to that of the above-described Example 9 except using, as the current collectors, cladding materials each of which was formed by sequentially stacking Al (15 μm; on the positive electrode side)/Fe (10 μm)/Cu (15 μm; on the negative electrode side).

Example 18

Bipolar Battery

A bipolar battery was completed by a similar method to that of the above-described Example 9 except using, as the current collectors, cladding materials each of which was formed by sequentially stacking Al (15 μm; on the positive electrode side)/Fe (10 μm)/Ni (6 μm; on the negative electrode side).

Example 19

Bipolar Battery

A bipolar battery was completed by a similar method to that of the above-described Example 9 except using, as the current collectors, cladding materials each of which was formed by sequentially stacking Al (15 μm; on the positive electrode side)/SUS316L (8 μm)/Cu (15 μm; on the negative electrode side)

Example 20

Bipolar Battery

A bipolar battery was completed by a similar method to that of the above-described Example 9 except using, as the current collectors, cladding materials each of which was formed by sequentially stacking Al (15 μm; on the positive electrode side)/Ti (10 μm)/Cu (15 μm; on the negative electrode side).

Example 21

Bipolar Battery

A bipolar battery was completed by a similar method to that of the above-described Example 9 except using, as the current collectors, cladding materials each of which was formed by sequentially stacking Al (15 μm; on the positive electrode side)/Ti (10 μm)/Ni (6 μm; on the negative electrode side).

Comparative Example 1

Single Layer Battery

A single layer battery was completed by a similar method to that of the above-described Example 1 except using Al (20 μm) foil as the positive electrode current collector.

Comparative Example 2

Single Layer Battery

A single layer battery was completed by a similar method to that of the above-described Example 1 except using Cu (15 μm) foil as the negative electrode current collector.

Comparative Example 3

Bipolar Battery

A bipolar battery was completed by a similar method to that of the above-described Example 9 except using Ni (6 μm) foil as the current collectors.

<Evaluation>
(Adhesion Properties)

In order to evaluate the adhesion properties between the current collector and the active material layers, a 90-degree peel test was performed for the electrode fabricated in the above-mentioned respective examples and comparative examples. Obtained results are shown in the following Table 6.

Note that the adhesion properties in the positive electrode current collectors were evaluated in Examples 1 to 4, the adhesion properties in the negative electrode current collectors were evaluated in Examples 5 to 8, and the adhesion properties on the positive electrode sides were evaluated in Example 9 to 21. Specifically, the evaluation was performed in conformity with the testing methods for peel strength of adhesives of JIS K 6854.

(Occurrence of Wrinkles)

It was visually confirmed whether or not the wrinkles occurred in the current collectors of the electrodes fabricated in the above-mentioned respective examples and comparative examples. Obtained results are shown in the following Table 2. Note that determination criteria as to whether or not the wrinkles occurred are as follows.

Double circle: no occurrence of the wrinkles was observed
Single circle: the occurrence of the wrinkles was hardly observed
Triangle: the occurrence of some wrinkles was observed
Cross: it was difficult to fabricate the battery owing to the occurrence of the wrinkles

TABLE 6

|  | Second metal layer | | | | First metal layer | | | |
|---|---|---|---|---|---|---|---|---|
|  | Type of metal | Thickness T2 (μm) | Hardness Hv2 | Young's modulus E2 (Gpa) | Type of metal | Thickness T1 (μm) | Hardness Hv1 | Young's modulus E1 (GPa) |
| Example 1 | Al | 15 | 30 | 70 | Ni | 6 | 600 | 206 |
| Example 2 | Al | 15 | 30 | 70 | Fe | 10 | 150 | 206 |
| Example 3 | Al | 15 | 30 | 70 | SUS316L | 8 | 200 | 180 |
| Example 4 | Al | 15 | 30 | 70 | Ti | 10 | 250 | 100 |
| Example 5 | Cu | 15 | 70 | 130 | Ni | 6 | 600 | 206 |
| Example 6 | Cu | 15 | 70 | 130 | Fe | 10 | 150 | 206 |
| Example 7 | Cu | 15 | 70 | 130 | SUS316L | 8 | 200 | 180 |
| Example 8 | Cu | 15 | 70 | 130 | Ti | 10 | 250 | 100 |
| Example 9 | Al | 15 | 30 | 70 | Fe | 10 | 150 | 206 |
| Example 10 | Al | 15 | 30 | 70 | SUS316L | 8 | 200 | 180 |
| Example 11 | Al | 15 | 30 | 70 | Ti | 10 | 250 | 180 |

TABLE 6-continued

| | | | | | | | | |
|---|---|---|---|---|---|---|---|---|
| Example 12 | Al | 15 | 30 | 70 | Cu | 10 | 70 | 130 |
| Example 13 | Cu | 15 | 70 | 130 | Fe | 10 | 150 | 206 |
| Example 14 | Cu | 15 | 70 | 130 | SUS316L | 8 | 200 | 180 |
| Example 15 | Cu | 15 | 70 | 130 | Ti | 10 | 250 | 100 |
| Example 16 | Al | 15 | 30 | 70 | Ni | 6 | 600 | 206 |
| Example 17 | Al | 15 | 30 | 70 | Fe | 10 | 150 | 206 |
| Example 18 | Al | 15 | 30 | 70 | Fe | 10 | 150 | 206 |
| Example 19 | Al | 15 | 30 | 70 | SUS316L | 8 | 200 | 180 |
| Example 20 | Al | 15 | 30 | 70 | Ti | 10 | 250 | 100 |
| Example 21 | Al | 15 | 30 | 70 | Ti | 10 | 250 | 100 |
| Comparative example 1 | Al | 15 | 30 | 70 | | | | — |
| Comparative example 2 | Cu | 15 | 70 | 130 | | | | — |
| Comparative example 3 | Ni | 15 | 600 | 200 | | | | — |

| | Third metal layer | | | | | |
|---|---|---|---|---|---|---|
| | Type of metal | Thickness T3 (μm) | Hardness Hv3 | Young's modulus E3 (GPa) | Adhesion properties | Wrinkles |
| Example 1 | Al | 15 | 30 | 70 | 320 | ○ |
| Example 2 | Al | 15 | 30 | 70 | 320 | ○ |
| Example 3 | Al | 15 | 30 | 70 | 310 | ○ |
| Example 4 | Al | 15 | 30 | 70 | 300 | ○ |
| Example 5 | Cu | 15 | 70 | 130 | 280 | ◎ |
| Example 6 | Cu | 15 | 70 | 130 | 290 | ◎ |
| Example 7 | Cu | 15 | 70 | 130 | 280 | ◎ |
| Example 8 | Cu | 15 | 70 | 130 | 270 | △ |
| Example 9 | | | — | | 310 | ○ |
| Example 10 | | | — | | 290 | ○ |
| Example 11 | | | — | | 280 | ○ |
| Example 12 | | | — | | 290 | △ |
| Example 13 | | | — | | 280 | ◎ |
| Example 14 | | | — | | 270 | ◎ |
| Example 15 | | | — | | 290 | ◎ |
| Example 16 | Cu | 15 | 70 | 130 | 330 | ◎ |
| Example 17 | Cu | 15 | 70 | 130 | 320 | ○ |
| Example 18 | Ni | 6 | 600 | 206 | 320 | ○ |
| Example 19 | Cu | 15 | 70 | 130 | 320 | ◎ |
| Example 20 | Cu | 15 | 70 | 130 | 330 | △ |
| Example 21 | Ni | 6 | 600 | 206 | 310 | △ |
| Comparative example 1 | | | — | | 300 | X |
| Comparative example 2 | | | — | | 260 | X |
| Comparative example 3 | | | — | | 220 | ○ |

From the results shown in Table 6, it is indicated that, as compared with the case where the battery is composed by using the conventional current collectors formed of the single layers, in accordance with the present invention, the occurrence of the wrinkles on the current collectors at the time of fabricating the electrodes is suppressed, and the adhesion properties between the current collectors and the active material layers can be enhanced.

This application is based upon and claims the benefit of priority from Japanese Patent Application No. 2007-137837 filed on May 24, 2007 and Japanese Patent Application No. 2008-109709 filed on Apr. 21, 2008, in the Japanese Patent Office, of which contents are incorporated herein by reference.

As above, the description has been made of the embodiments to which the invention invented by the inventors is applied; however, the present invention is not limited to the description and the drawings, which compose a part of the disclosure of the present invention according to the embodiments. Specifically, what is additionally mentioned is that, naturally, other embodiments, examples, operation technologies, and the like, which will be made by those skilled in the art based on the above-described embodiments, are entirely incorporated in the scope of the present invention.

What is claimed is:

1. An electrode for a nonaqueous solvent secondary battery, comprising:
   a current collector; and
   an active material layer formed on a surface of the current collector,
   wherein the current collector comprises:
      a first metal layer;
      a second metal layer positioned directly in contact with a first surface of the first metal layer; and
      a third metal layer composed of the same metal as the metal composing the second metal layer, and positioned directly in contact with a second surface opposite to the first surface of the first metal layer,
   wherein Young's modulus ($E1$, $E2$) of respective metals comprising the first metal layer and the second metal layer and respective thicknesses ($T1$, $T2$) of the first metal layer and the second metal layer satisfy following Expression:

$$E1 > E2; \text{ and } T1 < T2,$$

wherein:
(i) T1 is within a range of 1 to 100 μm,
(ii) T2 is within a range of 5 to 200 μm, and (iii) $1 < (T2/T1) \leq 5$.

2. The electrode according to claim 1, wherein the metal comprising the first metal layer is one selected from among the group consisting of nickel, iron, stainless steel, titanium and copper.

3. The electrode according to claim 1, wherein the metal comprising the second metal layer is one selected from the group consisting of aluminum and copper.

4. The electrode according to claim 1, wherein the thickness of the current collector is within a range of 23 to 40 μm.

5. The electrode according to claim 1, wherein the thickness of the first metal layer has a range of 1 to 10 μm, and the thickness of the second metal layer has a range of 5 to 20 μm.

6. The electrode according to claim 1, wherein polarities of respective active material layers formed on both surfaces of the current collector are the same.

7. A nonaqueous solvent secondary battery, comprising an electrode for a nonaqueous solvent secondary battery according to claim 6.

8. An electrode for a nonaqueous solvent secondary battery, comprising:
a current collector; and
an active material layer formed on a surface of the current collector,
wherein the current collector comprises:
a first metal layer;
a second metal layer positioned directly in contact with a first surface of the first metal layer; and
a third metal layer composed of the same metal as the metal composing the second metal layer, and positioned directly in contact with a second surface opposite to the first surface of the first metal layer,
wherein Vickers hardnesses (Hv1, Hv2) of respective metals comprising the first metal layer and the second metal layer and respective thicknesses (T1, T2) of the first metal layer and the second metal layer satisfy following Expression:

$Hv1 > Hv2$; and $T1 < T2$, wherein:
(i) T1 is within a range of 1 to 100 μm,
(ii) T2 is within a range of 5 to 200 μm, and (iii) $1 < (T2/T1) \leq 5$.

9. An electrode for a nonaqueous solvent secondary battery, comprising:
a current collector; and
an active material layer formed on a surface of the current collector,
wherein the current collector comprises:
a first metal layer; and
a second metal layer positioned directly in contact with a first surface of the first metal layer; and
a third metal layer composed of the same metal as the metal composing the second metal layer, and positioned directly in contact with a second surface opposite to the first surface of the first metal layer,
wherein Young's modulus (E1, E2) and Vickers hardnesses (Hv1, Hv2) of respective metals comprising the first metal layer and the second metal layer and respective thicknesses (T1, T2) of the first metal layer and the second metal layer satisfy following Expression:

$E1 > E2$; and $Hv1 > Hv2$; and $T1 < T2$, wherein:
(i) T1 is within a range of 1 to 100 μm,
(ii) T2 is within a range of 5 to 200 μm, and (iii) $1 < (T2/T1) \leq 5$.

* * * * *